United States Patent [19]

Priaroggia

[11] Patent Number: 4,540,889

[45] Date of Patent: Sep. 10, 1985

[54] METHOD AND APPARATUS FOR IMPROVING THE DIELECTRIC STRENGTH OF DIRECT CURRENT CABLE INSULATION

[75] Inventor: Paolo G. Priaroggia, Milan, Italy

[73] Assignee: Societa' Cavi Pirelli S.p.A., Milan, Italy

[21] Appl. No.: 550,248

[22] Filed: Nov. 9, 1983

[51] Int. Cl.³ .............................................. H02J 3/02
[52] U.S. Cl. .................................... 307/2; 340/310 R
[58] Field of Search .................. 307/1, 2, 3, 5, 8, 75, 307/77, 78; 340/310 R

[56] References Cited

U.S. PATENT DOCUMENTS

Re. 26,683  10/1969  Jakovlevich et al. .
3,702,939  11/1972  Darrow .................................... 307/2
4,124,886  11/1978  Black et al. ........................ 307/77 X
4,194,128   3/1980  Biglin ...................................... 307/3
4,417,093  11/1983  Occhini et al. ............ 174/102 SC X

FOREIGN PATENT DOCUMENTS 781616   3/1968  Canada .
1041783  4/1902  France .
699163   2/1931  France .
2337455  7/1977  France .
1240931  7/1971  United Kingdom .
1270280  4/1972  United Kingdom .
1361889  7/1974  United Kingdom .
1420984  1/1976  United Kingdom .
1427405  3/1976  United Kingdom .
1468721  3/1977  United Kingdom .

OTHER PUBLICATIONS

"High Voltage D.C. Cables: The State of the Art" by Maschio et al., Cigre, Aug. 21-29, 1974.
200 KV D.C. Submarine Cable Interconnection Between Sardinia and Corsica and Between Corsica and Italy, by Priaroggia, Cigre, Jun. 10-20, 1968.
Dielectric Phenomena in Impregnated Paper Insulated Cables for H.V.D.C. Trans. by Priaroggia, "Direct Current", vol. 8, No. 8, Aug. 1963.

Primary Examiner—A. D. Pellinen
Assistant Examiner—Derek S. Jennings
Attorney, Agent, or Firm—Brooks Haidt Haffner & Delahunty

[57] ABSTRACT

Method for improving the dielectric strength of insulation not subject to fluid pressure and used to insulate a conductor element, such as the conductor of a cable, an insulator, etc., subjected to direct current high voltage in which, during or prior to service use thereof, the insulation is subjected continuously or intermittently to a varying amplitude, direct current voltage. The amplitude of the variation is small relative to the average value of the direct current voltage and the frequency of the variation, preferably, is less than 60 Hz. Also, apparatus for providing the voltage of varying amplitude including an alternating current generator in series between the direct current source and the conductor element and inductor in parallel with the generator, the inductor having a low ohmic resistance and a high reactance relating, respectively, to the ohmic resistance and reactance of the generator.

20 Claims, 3 Drawing Figures

METHOD AND APPARATUS FOR IMPROVING THE DIELECTRIC STRENGTH OF DIRECT CURRENT CABLE INSULATION

The present invention relates to an improved method and system for improving the dielectric strength of insulation of a cable and/or other components of a high voltage, direct current, electric power transmission system.

More precisely, the present invention relates to direct current cables intended for operation at voltages of over 100 kV.

Further, the invention can be advantageously applied to the components or accessories for direct current, electric power transmission systems, provided with insulating material, such as, for example, the overhead line insulators for direct current, or for the insulation of the direct current components used in the stations for transforming the current from alternating current to direct current.

For the sake of simplicity, the following description will refer to insulation for direct current cables; however, it is to be understood that the disclosed concepts can be applied also to the insulation of the components or accessories described hereinbefore.

It is known that in direct current systems, especially in a cable having an insulation not kept under pressure, neither under gas, nor under liquid pressure, a critical situation for the insulation dielectric strength occurs during the thermal transients which occur as soon as the cooling phase starts, after the load has been disconnected.

The dielectrics of these cables which are not fed with oil or gas and, consequently, which are not subjected to intentionally applied fluid pressure, cannot have any appreciable longitudinal movement of fluids during said thermal transients, but only expansions or contractions prevailingly in the radial sense.

With equal outer pressure, during the heating and the radial expansion of the insulation, there is a rise of the inner pressure.

During the cooling phase, owing to the thermal contraction of the insulation, the inner pressure becomes lower and there takes place a sudden formation, or increase in dimensions, of cavities or gaseous bubbles, in which the pressure of the residual gas is much lower than the atmospheric one. Said cavities become points of partial discharges, which turn into disruptive discharges which can lead to the break-down of the insulation.

This result has been extensively demonstrated during tests on extruded insulation cables which have been carried out in the laboratories of the assignee of this application and for the results with cables provided with an insulation of paper impregnated with a compound, reference is made to the following literature:

(a) "High voltage direct current cables: the state of the art"—G. Maschio & E. Occhini—21/29 August 1974—CIGRE (b) "200 kV D.C. submarine cable interconnection between Sardinia and Corsica and between Corsica and Italy"—Gazzana Priaroggia & Palandri—10/20 June, 1968—CIGRE (c) "Dielectric Phenomena in Impregnated Paper Insulated Cables for H.V.D.C. Transmission'"—Gazzana Priaroggia—Direct Current Vol. 8 N.8, August 1963.

Thermal differences of about 10° to 15° C. across the insulation during the heating of the cable with maximum gradients on the cable conductor of about 50 kV/mm and even lower are sufficient to cause the sudden breakdown of the insulation within the first two hours from the disconnection of the load.

The cavities also form during the cooling phase with cables subjected to alternating current, or if already existing, increase in dimension, but such cavities are less dangerous than in the case of direct current. This is due, according to the cited literature, at least to three different factors as follows:

(1) The distribution of the electric field in direct current systems is different from alternating current systems. In particular, in gas-filled cavities having a flat shape, during the pre-ionization phase, there can occur a concentration of gradient with direct current which is much higher than the concentration with alternating current. This is due to the different behavior of the relative conductivities with direct current as compared with the relative permitivities with alternating current. In fact, in this latter case, the distribution of the potential gradient is a function of the relative constant dielectric or permitivity, while with direct current, it is a function of the resistivity. With direct current, the resistivity of the gaseous cavity being practically infinite, there is localized at said gas-filled cavity a very high gradient which causes said gaseous cavity to represent a considerable discharge risk.

(2) The average gradients to which the direct current cables are subjected in service, are much higher than those (measured at peak value) to which alternating current cables are subjected.

(3) The accumulation of the static charges, with direct current, represents an amount of energy ready to disrupt with the starting of ionization in the gas bubble. This has no comparison with alternating current where the alternating of polarities exercises a controlling action over the draining of the charges.

The prior art has suggested that a remedy to the drawbacks mentioned above may be found by having recourse, with the extruded insulation cables, to the so-called "dry curing"—cross-linking of the insulation in an oil or inert gas ambient or to dry cooling, in order to reduce to the minimum the number and the dimensions of the gaseous cavities whereas with respect to the cables insulated with paper impregnated with viscous oils or with viscous oil compounds, by arranging that in said compound, during the shrinkage phase, cavities as small as possible be formed by using very thin papers, wound in a compact manner. The result obtained on the dielectric strength is, however, rather slight, being at the most of the order of 10% of the maximum gradient on the conductor.

Also, it has been tried to use in the cables insulated with impregnated paper, tapes of paper impregnated with a non-migrating compound, favoring the formation of preformed cavities. Said preformed cavities should have the theoretical advantage, during the thermal transients, to change their dimension limited in size, presenting in their inside a non-negligible gaseous pressure, sufficient to block or reduce the gaseous ionization. In the present practice, this objective is however, difficult to achieve.

Italian Pat. No.708 832 teaches how to obtain a steady resistivity in the dielectric of direct current impregnated cables by incorporating anti-static substances into the impregnating mass and/or into the insulating tape. U.S. application Ser. No. 327,353, filed Dec. 4, 1981 and corresponding to Canadian application Ser. No. 393,417, filed Dec. 30, 1981, both applications being assigned to the assignee of the present application, suggests the use of low resistivity impregnating compounds to reduce the gradients on the gas-filled cavities and to facilitate the draining of the charges around the cavities of the insulation of the direct current cables.

However, the embodiments according to the proposal of said Italian patent and said patent applications, although having given results which, without doubt, are better with respect to the state of the art known up to this time, do not permit the obtaining of that optimal behavior which would be desirable for direct current cables for service voltage of 300 kV and over.

One object of the present invention is to provide a new solution through which the above-mentioned drawbacks can be eliminated in the insulation of a cable and/or other components for high voltage, direct current, power transmission systems. Such solution is based upon a very important observation, namely, it has observed that the cited drawbacks take place when the direct voltage applied to the cable conductor is rigorously constant.

However, the direct voltage generated by the rectifiers known in the state of the art is not constant but presents wave-like movements or "ripples". These wave-like movements have been considered up to now only as an element of disturbance and parasitic. In fact they can produce losses in the dielectric because of capacitive currents, parasitic currents in the conductors and other negative effects.

The present technique regarding systems using direct voltages provides for the connecting, at the sealing ends, of levelling filters for eliminating said wave-like movements. When the direct current line comprises a very long cable, in the order of 50 to 100 km or over, the capacity of the cable exercises a filtering effect, already known per se, so that the "ripples" can be totally absent on the cable.

Applicant has observed that in cables for the use with direct current, having an insulation not kept under pressure, the dielectric strength of said insulation is substantially improved when the voltage applied to the conductor presents wave-like movements or "ripples" due to an alternating component, with a pre-fixed amplitude, measured over the peak values. The phenomenon by which the addition of an alternating component to a direct component favors the dielectric strength of the insulation is not yet completely understood.

However, Applicant postulates that the "ripples" exercise an action for controlling the draining of charges around the cavities, or they favor the rapid establishment of a positive pressure in the cavities sufficient to block the dangerous disruptive charges, improving in such a way the dielectric strength.

Among the other things, it has been possible to observe that in some cases the temporary application, for example, from 10 to 30 days, of a direct voltage with the overlapping of "ripples" of pre-determined value, can have a lasting effect, in the sense that the beneficial effect on the insulation strength is extended in time even when the "ripples" are subsequently eliminated.

The main object of the present invention is a method for improving the insulation dielectric strength of a cable and/or of other components for high voltage, direct current, electric power transmission systems, said cable and/or said components comprising at least a conductor element and insulation not kept under pressure, said method being characterized by the fact of feeding the conductor element with a voltage resulting from the superimposing of an alternating voltage having a prefixed amplitude on a direct voltage.

To the purposes of the present invention, the term "conductor element" is to be understood as meaning the conductor of a cable, or the high voltage electrode of said components.

In a preferred embodiment, said method provides that said alternating voltage has an amplitude comprised between 0.5% and 10%, and preferably between 1% and 5% of the value of said direct voltage.

Another preferred embodiment provides that said alternating voltage has a frequency not higher than 60 periods/second and preferably comprised between 1 and 20 periods/second.

Another object of the present invention is to provide a system for feeding a cable and/or other components for high voltage, direct current, electric power transmission systems, said cable and/or said components comprising at least a conductor element and insulation not kept under pressure, said system being characterized by the fact of comprising means for feeding said conductor element with a voltage resulting from the superimposing of an alternating voltage having a prefixed amplitude on a direct voltage.

Further, the present invention relates to an electric cable, as well as to any component for high voltage direct current, power transmission systems, both having an insulation not kept under pressure and fed according to the method and/or system mentioned above.

Other objects and advantages of the present invention will be apparent from the following detailed description of the presently preferred embodiments thereof, which description should be considered in conjunction with the accompanying drawings in which.

Figure 1:
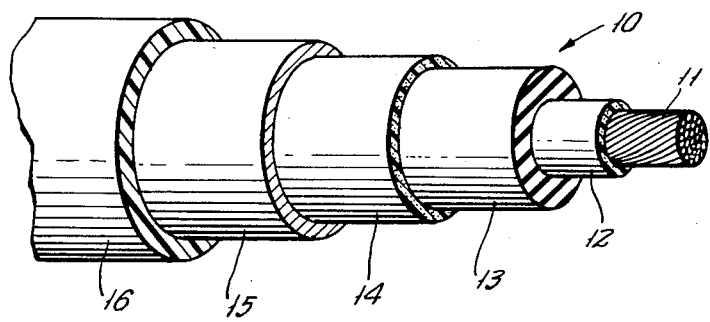
FIG. 1 represents schematically a length of direct current cable with extruded insulation.

FIG. 1 illustrates an extruded insulation cable 10 which comprises at least a conductor 11 around which there is provided an inner semi-conductive screen 12 which could be provided in a known way, for example, by extrusion of a semi-conductive material.

The insulation 13, constituted by one or more layers of extruded insulating material, surrounds the semi-conductive screen 12 and an outer semi-conductive screen 14 surrounds said insulation 13.

In the illustrated example, the elements 11–14 are enclosed in a metallic sheath 15 that acts as a barrier against the penetration of moisture. Said metallic sheath could be covered with protective layers known in the art, or with other elements which become necessary for contingent conditions. In FIG. 1 the metallic sheath 15 is covered with an anticorrosive sheath 16.

Although the example of FIG. 1 represents an extruded insulation cable, it is understood that said insulation could be of other nature, for example, could be of tapes wound of paper impregnated with oil or with a mixture of oils, or tapes of synthetic or semi-synthetic material impregnated with the same oils or mixtures. What is important is that the insulation is not kept under any internal pressure, in consequence of which thermal transients can produce cavities or gaseous bubbles (or increase in dimension thereof) during the cooling phase.

Figure 2:
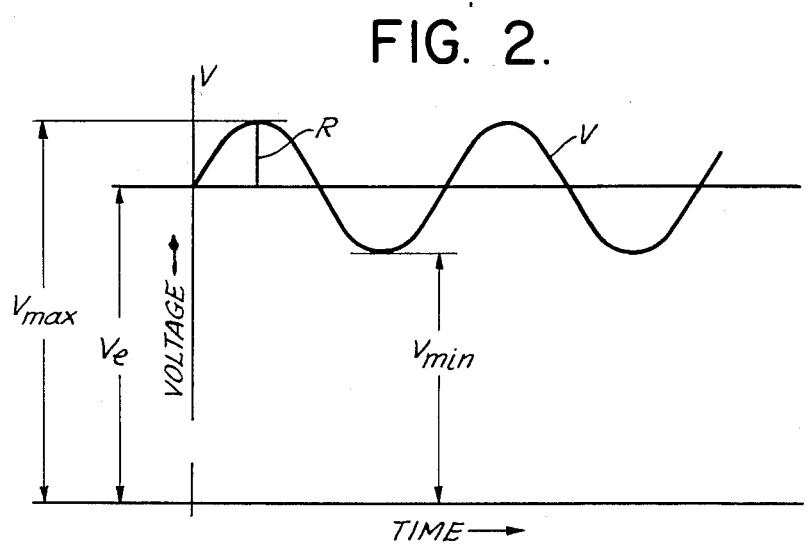
FIG. 2 shows a graph of the feeding voltage according to the invention and of its component voltages.

A direct voltage V (FIG. 2) which is not rigorously constant but which varies in amplitude and which extends for the whole length of the cable, is applied to the conductor 11 of the cable.

Said voltage V is the resultant of superimposing on a direct voltage having a constant value of an alternating voltage (in the example, but not necessarily, sinusoidal) having a pre-fixed amplitude R (of the "ripple") and such a value as to raise the dielectric strength of the insulation by controlling the draining of the charges around the gas-filled cavities, which form in the dielectric 13 during the cooling phase of the cable, due to the thermal transients.

The "ripple" which, up to now, has been considered as an element of disturbance and consequently parasitic and which has been considered as desirable to completely eliminate, becomes, according to the present invention, a favorable element, without causing appreciable disadvantages, because it has been found that the component of alternating voltage to be superimposed on the direct voltage and sufficient to obtain the desired dielectric strength is within the limits tolerated by cables and components used for direct voltages.

It has been observed that with a "ripple" of amplitude R defined by the ratio:

$$R = (V_{max} - V_{min})/(V_{max} + V_{min})$$

and having a value comprised between 0.5% and 10%, and preferably between 1% and 5%, the cables having an insulation not kept under pressure and used for voltages comprised between 300 and 500 kV are able to bear, without damage, thermal transients with gradients of the order of 60 to 70 kV/mm, and also higher, and with thermal differences between the radially innermost and radially outermost surfaces of the insulation higher than 15° C., without risks of break-down in the dielectric 13.

Further, it has been observed that alloting a frequency not higher than 60 periods/second to the alternating component the parasitic effects are substantially reduced due to the presence of the "ripple" (losses in the dielectric, capacitive currents, parasitic currents in the conductors and so on).

The efficaciousness of the alternating component on the dielectric strength of the insulation is notably appreciable also with frequency of 1 period/second, whereas the parasitic effects become practically negligible.

In particular frequencies comprised between 1 and 20 periods/second have been demonstrated to be useful. Satisfactory results have been obtained with frequency of 16·($\frac{2}{3}$) periods/second.

The alternating component superimposed on the direct component can be applied to the cable according to various different systems.

It can be applied during the cable service in a continuous manner for the whole time in which said service lasts, or it can be applied always during the service, but in a discontinuous manner, for example, for a period of time comprised between 10 and 30 days and repeated from 1 to 3 times every year. In both cases, the alternating component will be superimposed on the service value of the direct component.

Said alternating component superimposed on said direct component could be also applied to the cable preventively, i.e., before the cable itself starts the service, for example, during the tests, for a temporary period comprised between 10 and 30 days. In this latter case, the direct component can have values different from the service one.

The shorter the time that the alternating component is applied, the less important the parasitic effects induced in the cable will be. Therefore, in this case, its frequency can assume the higher values among those indicated above and if desired, also higher.

Also, the most convenient amplitude R of the "ripple" can depend on the length of time for applying the alternating component. If this latter is applied in a continuous manner, it is preferable that the amplitude of the "ripple" be such as to give partial gradients on the cable lower than 5 kV/mm in effective value, to guarantee the cable safety (by "partial gradients" is meant those gradients due only to the alternating component).

If the alternating component is applied in a discontinuous or temporary manner as indicated hereinbefore, said partial gradients on the cable can reach also 10 kV in effective value and over.

A "ripple" having the amplitude values indicated above, could be applied to the cable through the same means which is used for the feeding in direct voltage. For example, a direct voltage of varying amplitude could be applied through the same rectifier which generates direct voltage, since the rectifier never does produce a voltage perfectly constant. However, said "ripple" is generally at a high frequency, for example, 100 periods/second or higher.

Further, it happens that in long length cables, or in cables belonging to circuits connected to large capacitances the voltage of the rectifier, which has a ripple when the rectifier is without load, is perfectly levelled when the load is applied.

Figure 3:
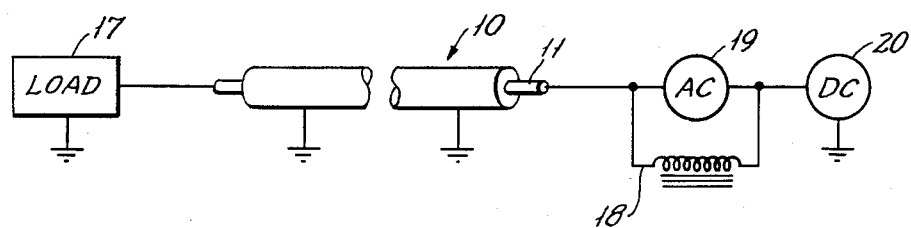
FIG. 3 is a diagrammatic illustration of a system for feeding the cable of FIG. 1 according to the method of the present invention.

In order to superimpose the alternating voltage on a direct voltage in conformity with the present invention, it is suggested that a feeding system of the type shown in FIG. 3 be used.

FIG. 3 shows an alternator or alternating current generator, in series with a direct current generator 20 and connected to the conductor 11 of the cable 10. The cable 10 is connected to the opposite end to the load 17.

In order to avoid having the direct current pass through the alternator 19, it is necessary to shunt this latter through an inductor 18 having respectively a much lower ohmic resistance (for example, 10 times) and an inductive reactance much higher (for example, 10 times) than the internal ones of said alternator.

The invention has shown to be useful to improve the dielectric strength of the insulation of direct current cables provided with extruded insulation, for example, polyethylene or cross-linked polyethylene, provided with insulation constituted by tapes of paper, or synthetic material, or semi-synthetic material, impregnated with oils or a mixture of oils or provided with insulation of any other material considered insulating in the art of direct currents and which comprises cavities changeable in dimension during the thermal transients.

The method according to the invention can be further advantageously applied not only to the cable field, but also to the field of the components for high voltage, direct current, electric power transmission systems which are provided with an insulation not kept under pressure, as, for example, the insulators of a direct current overhead line, or the insulation of the direct current components constituting the stations for transforming the current from alternating to direct, etc.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A method for improving the dielectric strength with respect to a direct current voltage of the insulation around a conductor element for forming part of a direct current power transmission system, said insulation being without fluid pressure thereon, said method comprising subjecting said insulation throughout its length to a direct current voltage of a predetermined magnitude applied to said conductor and varying the amplitude of said direct current voltage throughout the length of said insulation at a periodic rate, said amplitude being varied by an amount less than said predetermined magnitude and less than an amount which will cause voltage breakdown in said insulation.

2. A method as set forth in claim 1 wherein said amount is between 0.5% and 10% of said predetermined magnitude.

3. A method as set forth in claim 2 wherein said amount is between 1% and 5% of said predetermined magnitude.

4. A method as set forth in claim 1 wherein said periodic rate does not exceed about 60 Hz.

5. A method as set forth in claim 4 wherein said periodic rate is between about 1 Hz and about 20 Hz.

6. A method as set forth in claim 1 wherein the amplitude of the voltage applied to said conductor is varied by superimposing an alternating voltage on the voltage of said source.

7. A method as set forth in claim 6 wherein said alternating voltage is superimposed on the voltage of said source, by connecting said source to said conductor element through an alternating current generator and an inductor connected in parallel with said generator, said inductor having an ohmic resistance which is low relative to the ohmic resistance of said generator and having a reactance which is high relative to the reactance of said generator.

8. A method as set forth in claim 1 wherein said conductor element is connected to a direct current power source at a first point and is connected to a load at a second point remote from said source and wherein the amplitude of the voltage applied to said conductor element is varied during the time that direct current is supplied to said load.

9. A method as set forth in claim 8 wherein the amplitude of the voltage applied to said conductor element is varied during all the time that current is supplied to said load.

10. A method as set forth in claim 8 wherein the amplitude of the voltage applied to said conductor element is varied at separated intervals of time during all the time that current is supplied to said load.

11. A method as set forth in claim 10 wherein said intervals of time are between about ten days and about thirty days in duration and are repeated about one to three times per year.

12. A method as set forth in claim 1 wherein the amplitude of the voltage applied to said conductor element is varied prior to placing the conductor element in service.

13. A method as set forth in claim 12 wherein the amplitude of the voltage element is varied for about ten to about thirty days prior to placing the conductor element in service.

14. A high volage, direct current, electric power transmission system comprising a conductor element with insulation therearound, said insulation being without fluid pressure thereon, a source of high voltage, direct current connected to said conductor element at a first point for supplying a direct current voltage of a predetermined magnitude to said conductor element and to a load at a second point remote from said first point for supplying direct current to said load, and means connected to said source for varying the voltage supplied to said conductor element throughout its length at a periodic rate, said amplitude being varied by an amount less than said predetermined magnitude and less than an amount which will cause voltage breakdown of said insulation.

15. A high voltage, direct current, electric power transmission system as set forth in claim 14 wherein said amount is between 0.5% and 10% of said predetermined magnitude.

16. A high voltage, direct current, electric power transmission system as set forth in claim 15 wherein said amount is between 1% and 5% of said predetermined magnitude.

17. A high voltage, direct current, electric power transmission system as set forth in claim 14 wherein said periodic rate does not exceed about 60 Hz.

18. A high voltage, direct current, electric power transmission system as set forth in claim 17 wherein said periodic rate is between about 1 Hz and about 20 Hz.

19. A high voltage, direct current, electric power transmission system as set forth in claim 14 wherein said means for varying the voltage supplied to said conductor element comprises an alternating current generator connected in series between said source and said conductor element and an inductor connected in parallel with said alternating current generator and in series between said source and said conductor element, said inductor having a lower ohmic resistance and a higher reactance than, respectively, the ohmic resistance and reactance of said alternating current generator.

20. A high voltage, direct current, electric power transmission system as set forth in claim 14 wherein said conductor element is the conductor of a cable and wherein said system further comprises a load, said conductor element interconnecting said source and said load.

* * * * *